(12) United States Patent
Kusada et al.

(10) Patent No.: US 6,173,569 B1
(45) Date of Patent: Jan. 16, 2001

(54) CATALYST DETERIORATION DETECTING APPARATUS FOR INTERNAL COMBUSTION ENGINE

(75) Inventors: Masaki Kusada; Katsuhiko Hirose; Hiroshi Kanai; Toshifumi Takaoka, all of Susono; Toshio Inoue, Gotenba; Takahiro Nishigaki; Masakiyo Kojima, both of Susono, all of (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/468,221

(22) Filed: Dec. 20, 1999

(30) Foreign Application Priority Data

Dec. 28, 1998 (JP) .................................. 10-374455

(51) Int. Cl.[7] ...................................................... F01N 3/00
(52) U.S. Cl. .................................. 60/277; 60/274; 60/285; 60/276; 180/65.2; 180/65.3; 180/65.4
(58) Field of Search .............................. 60/276, 285, 277, 60/274; 180/65.2, 65.3, 65.4

(56) References Cited

U.S. PATENT DOCUMENTS

| 5,323,868 | * | 6/1994 | Kawashima | 180/65.4 |
| 5,327,991 | * | 7/1994 | Yoshida | 180/65.4 |
| 5,765,370 | * | 7/1998 | Hanafusa et al. | 60/277 |
| 5,785,137 | * | 7/1998 | Reuyl | 180/65.2 |
| 5,785,138 | * | 7/1998 | Yoshida | 180/65.4 |
| 5,937,638 | * | 8/1999 | Akazaki et al. | 60/277 |
| 5,956,940 | * | 9/1999 | Manaka et al. | 60/277 |
| 5,964,088 | * | 10/1999 | Kinugasa et al. | 60/285 |
| 6,003,307 | * | 12/1999 | Naber et al. | 60/277 |

FOREIGN PATENT DOCUMENTS

| 2-033408 | 2/1990 | (JP) . | |
| 2-207159 | 8/1990 | (JP) . | |
| 405195759 | * | 8/1993 | (JP) ..................................... 60/277 |
| 6-159048 | 6/1994 | (JP) . | |

* cited by examiner

Primary Examiner—Thomas Denion
Assistant Examiner—Diem Tran
(74) Attorney, Agent, or Firm—Kenyon & Kenyon (57) ABSTRACT

A catalyst deterioration detecting apparatus for a hybrid vehicle having an internal combustion engine and an electric motor as power sources includes an air-fuel ratio sensor downstream of a catalyst disposed in an exhaust passage of the engine. An amount of oxygen stored in the catalyst is estimated and, based on the estimated amount of oxygen and an output produced by the air-fuel ratio sensor after the engine is restarted after having been temporarily stopped, it is determined whether the catalyst has excessively deteriorated.

10 Claims, 5 Drawing Sheets

CATALYST DETERIORATION DETECTING APPARATUS FOR INTERNAL COMBUSTION ENGINE

The disclosure of Japanese Patent Application No. HEI 10-374455 filed on Dec. 28, 1998 including the specification, drawings and abstract is incorporated herein by reference in its entirety.

BACKGROUND OF THE INVENTION

1. Field of the Invention

The present invention relates to a catalyst deterioration detecting apparatus for an internal combustion engine and, more particularly, to a catalyst deterioration detecting apparatus for an internal combustion engine provided in a hybrid vehicle employing both an internal combustion engine and an electric motor as power sources.

2. Description of the Related Art

A three-way catalyst of a catalytic converter disposed in an exhaust passage of an internal combustion engine has an oxygen storage function taking up oxygen when the air-fuel ratio is on the fuel-lean side of a stoichiometric air-fuel ratio and, when the air-fuel ratio turns to a fuel-rich side of the stoichiometric air-fuel ratio, causing oxygen previously taken up during the fuel-lean state to react with hydrocarbons and carbon monoxide present in the exhaust gas. If the oxygen storage function of the catalyst deteriorates, the emission control performance becomes degraded. That is, hydrocarbons and carbon monoxide are let out to the downstream side of the catalyst, so that maintenance of good emission quality becomes difficult. In order to maintain good emission quality, it is necessary to detect a degree of deterioration of the catalyst and determine whether the catalyst has deteriorated excessively based on the degree of deterioration and, when it is determined that the catalyst has deteriorated excessively, to visually notify a driving person of the deterioration of the catalyst and change the air-fuel ratio control in accordance with the degree of deterioration of the catalyst.

Various apparatuses for detecting the degree of deterioration of a three-way catalyst based on the degree of deterioration of the oxygen storage function of the catalyst have been proposed. For example, a catalyst deterioration degree detecting apparatus disclosed in Japanese Patent Application Laid-Open No. HEI 6-159048 detects a degree of deterioration of a catalytic converter in the following manner. After switching the air-fuel ratio to the rich side following execution of a fuel cut control of the engine, the catalyst deterioration degree detecting apparatus calculates an amount of oxygen released from the catalytic converter during a period of time up to a time at which the air-fuel ratio downstream of the catalyst actually switches from the lean side to the rich side, based on a total amount of exhaust gas that passes through the catalytic converter during that period and the rich side-switched air-fuel ratio. Considering the calculated released amount of oxygen as indicative of an oxygen adsorbing capacity of the catalytic converter, the apparatus detects a degree of deterioration of the catalytic converter.

The aforementioned apparatus can be applied to a hybrid vehicle that selectively uses power from an internal combustion engine and power from an electric motor and temporarily stops the engine when using power from the motor. However, in such case, it is difficult to determinate a deterioration of a catalyst with high precision. The reason is that if the engine fuel cut is continued for a long time, the temperature of the catalyst is decreased so that the catalyst cannot store oxygen up to the maximum oxygen adsorbing capacity thereof even in the presence of an excess amount of oxygen. Conversely, if the fuel cut duration is short, there is not provided a time needed for sufficient adsorption of oxygen to the catalyst. In such cases, an excessive degree of deterioration of the catalyst is detected although the amount of oxygen stored in the catalyst is less than the maximum oxygen adsorbing capacity of the catalyst, so that the determination regarding deterioration of the catalyst may not be performed with high precision.

SUMMARY OF THE INVENTION

Accordingly, it is an object of the invention to provide a catalyst deterioration detecting apparatus for an internal combustion engine that is capable of detecting a degree of deterioration of a catalyst with high precision even when applied to a hybrid vehicle.

To achieve the aforementioned and other objects of the invention, one aspect of the invention provides catalyst deterioration detecting apparatus for detecting deterioration of a catalyst provided in an exhaust passage of an internal combustion engine whose output shaft is connected to an electric motor. The catalyst deterioration detecting apparatus includes an air-fuel ratio sensor provided downstream of the catalyst, and a controller which performs a control such that the internal combustion engine is temporarily stopped and the electric motor is driven, under a predetermined vehicle running condition, and which estimates an amount of oxygen stored in the catalyst, and which determines whether the catalyst has deteriorated, based on the estimated amount of oxygen and an output produced by the air-fuel ratio sensor after the internal combustion engine is restarted.

In this apparatus, the controller estimates an amount of oxygen stored in the catalyst. Based on the estimated amount of oxygen and changes in the output produced by the air-fuel ratio sensor downstream of the catalyst after the internal combustion engine is restarted, the controller determines the amount of oxygen stored in the catalyst and the status of release of oxygen therefrom, and thereby determines whether the catalyst has deteriorated.

In this apparatus, it is also possible to determine whether the catalyst has deteriorated, when the estimated amount of oxygen is equal to or greater than a predetermined amount. Therefore, the catalyst deterioration detecting apparatus performs the catalyst deterioration determination after verifying that the catalyst has stored oxygen substantially up to the limit of the oxygen storing capacity of the catalyst, so that the determination can be performed with high precision.

It is also possible to supply a fuel-rich mixture from the beginning of a restart of the internal combustion engine and to determine whether the catalyst has deteriorated, based on a time duration of response to supply of the fuel-rich mixture, that is, a time duration between the beginning of the restart of the engine and reversion of the output of the air-fuel ratio sensor from a lean side to a rich side.

In this case, the catalyst deterioration determination is performed based on the time duration between the forced switching of the air-fuel ratio upstream of the catalyst to the rich side and the switching of the air-fuel ratio downstream of the catalyst from the lean side to the rich side, that is, the time duration up to the beginning of release of oxygen from the catalyst. Therefore, the catalyst deterioration determination can be performed within a short time. Furthermore, the degree of deterioration can be quantitatively determined.

In the catalyst deterioration detecting apparatus, an amount of oxygen stored in the catalyst may be estimated during a temporary stop of the internal combustion engine. Furthermore, an atmosphere around the catalyst may be caused to contain an excess amount of oxygen before the internal combustion engine is temporarily stopped.

If the internal combustion engine is stopped when the catalyst atmosphere contains an excess amount of oxygen, transfer of heat from the catalyst to the outside of the catalyst by exhaust gas is considerably reduced, so that the decreasing rate of the catalyst temperature becomes small. As a result, a condition in which an excess amount of oxygen is present near the catalyst and the catalyst has a relatively high temperature that allows the catalyst to store oxygen is maintained. Therefore, the catalyst stores oxygen up to the maximum oxygen adsorbing capacity even during a stop of the internal combustion engine.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENT

A preferred embodiment of the invention will be described with reference to the accompanying drawings.

Figure 1:
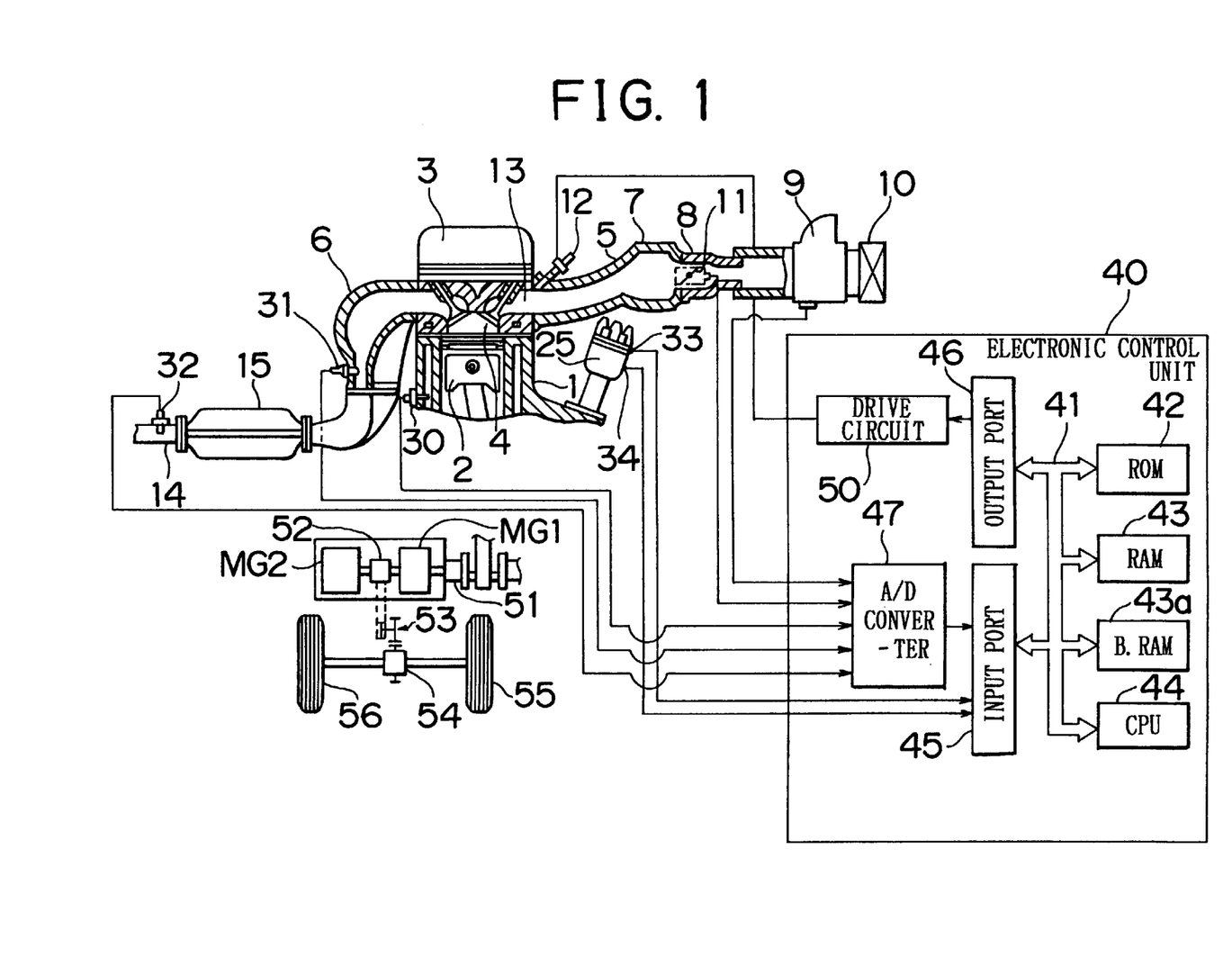
FIG. 1 is an illustration of an overall construction of an embodiment of the invention.

FIG. 1 illustrates an overall construction of the embodiment of the invention. An internal combustion engine has a cylinder block 1, pistons 2, a cylinder head 3, combustion chambers 4, an intake manifold 5, and an exhaust manifold 6. The intake manifold 5 is connected to an air cleaner 10 via a surge tank 7, an intake duct 8, and an air flow meter 9. A throttle valve 11 is disposed in the intake duct 8. Fuel injection valves 12 are disposed in the intake manifold 5 so as to inject fuel toward intake ports 13. The exhaust manifold 6 is connected to an exhaust pipe 14. Disposed in partway of the exhaust pipe 14 is a three-way catalytic converter 15 that simultaneously lessens three major fractions of exhaust gas, that is, hydrocarbons (HC), carbon monoxide (CO), and oxides of nitrogen (NOx).

An electronic control unit 40 is formed by a digital computer having a ROM 42, a RAM 43, a backup RAM 43a, a CPU 44, an input port 45, and an output port 46 that are interconnected by a bidirectional bus 41. The backup RAM 43a is provided for retaining stored data even after supply voltage from a battery discontinues. A plurality of detectors for detecting conditions of the engine and an input portion of the electronic control unit 40 will next be described. A water temperature sensor 30 for detecting the temperature of cooling water THW is provided in a water jacket of the cylinder block 1. An output signal of the water temperature sensor 30 is inputted to the input port 45 via an A/D converter 47. The air flow meter 9 produces an output voltage proportional to the flow of intake air. The output voltage from the air flow meter 9 is also inputted to the input port 45 via the A/D converter 47. An upstream air-fuel ratio sensor 31 disposed in the exhaust manifold 6 and a downstream air-fuel ratio sensor 32 disposed in the exhaust pipe 14 separately detect oxygen concentrations in exhaust gas. Output signals of the air-fuel ratio sensors 31, 32 are also inputted to the input port 45 via the A/D converter 47.

A crank angle sensor 33 disposed in a distributor 25 detects the crank angle of the engine, and outputs a pulse signal at every revolution of 30° in crank angle (hereinafter, expressed as 30° CA). A crank angle reference sensor 34 outputs two pulse signals during every two revolutions (720° CA) of the crankshaft of the engine, that is, outputs a pulse signal near the top dead center (TDC) of the compression stroke in No. 1 cylinder and another pulse signal near the top dead center (TDC) of the compression stroke in No. 4 cylinder that is shifted by 360 ° CA in phase from the TDC of the compression stroke in No. 1 cylinder. These pulse signals serve as references for determining the fuel injection timing and the ignition timing of each cylinder. Cylinder discrimination is performed during the first two revolutions of the crankshaft when the engine starting operation is begun, by using the aforementioned two pulse signals. The pulse signals from the crank angle sensor 33 and the crank angle reference sensor 34 are directly inputted to the input port 45.

An output portion of the electronic control unit 40 is formed by the output port 46 and a drive circuit 50. The fuel injection valves 12 are connected to the drive circuit 50. In accordance with a conventional fuel injection control, the fuel injection valves 12 inject fuel toward the intake ports 13.

The engine draws a mixture of air taken in via the throttle valve 11 and fuel injected by each fuel injection valve 12 into the corresponding combustion chamber 4, and converts linear motions of the pistons 2 driven by explosion of the air-fuel mixture into rotation of the crankshaft 51.

The crankshaft 51 is mechanically connected to a power transmitting gear 53 via a planetary gear 52, a starter motor MG1, and a drive motor MG2. The power transmitting gear 53 is connected to a differential gear 54 by gear meshing. Therefore, power outputted from any one of the internal combustion engine, the starter motor MG1 and the drive motor MG2 is eventually transmitted to right and left drive wheels 55, 56.

Hybrid systems in which drive wheels are driven by using power from an engine and an electric motor as describe above can be roughly divided into two types, that is, a series hybrid type and a parallel hybrid type. A series hybrid type system drives a generator by using the engine, and uses the thus-generated electricity to drive the motor and thereby drive the wheels. A parallel hybrid type system allows both the engine and the motor to drive the wheels, and selectively uses power from the engine and power from the motor in accordance with driving conditions. This embodiment adopts a system based on a combination of the two types, that is, a system in which the engine and the motor are selectively used in drive modes that are set in accordance with vehicle running conditions (1) to (6).

(1) Takeoff and/or light-load running

Fuel to the engine is cut, and the drive motor MG2 is used to drive the vehicle.

(2) Ordinary running

The engine is started in accordance with a request regarding the throttle valve opening and the like. Power from the engine is divided by a power dividing mechanism that employs the planetary gear 52. A divided portion of the power is delivered to drive the vehicle driving motor MG2, and the other portion is delivered to drive the starter motor MG1 serving as a generator. Energy generated by the starter motor MG1 is used to assist the driving of the drive motor MG2.

(3) Full throttle acceleration

In addition to the starter motor MG1, the battery (not shown) is also used to supply power to the drive motor MG2.

(4) Deceleration and braking

The drive wheels 55, 56 drive the drive motor MG2, so that the drive motor MG2 serves as a generator, thereby performing regenerative braking. Energy recovered through the regenerative braking is stored into the battery.

(5) Battery charging

The battery is controlled so as to maintain a constant charged state. If the amount of charge in the battery is excessively small, the battery is charged by using the starter motor MG1 as a generator. If the amount of battery charge is excessively large, power is supplied therefrom to the drive motor MG2.

(6) Stop

When the vehicle stops, the engine is automatically stopped.

The aforementioned drive modes are discriminated on the basis of output signals from an ignition key device, an accelerator pedal position sensor, a brake pedal position sensor, a battery voltage sensor, and the like (not shown).

Catalyst deterioration determination according to the invention will be described below.

Figure 2:
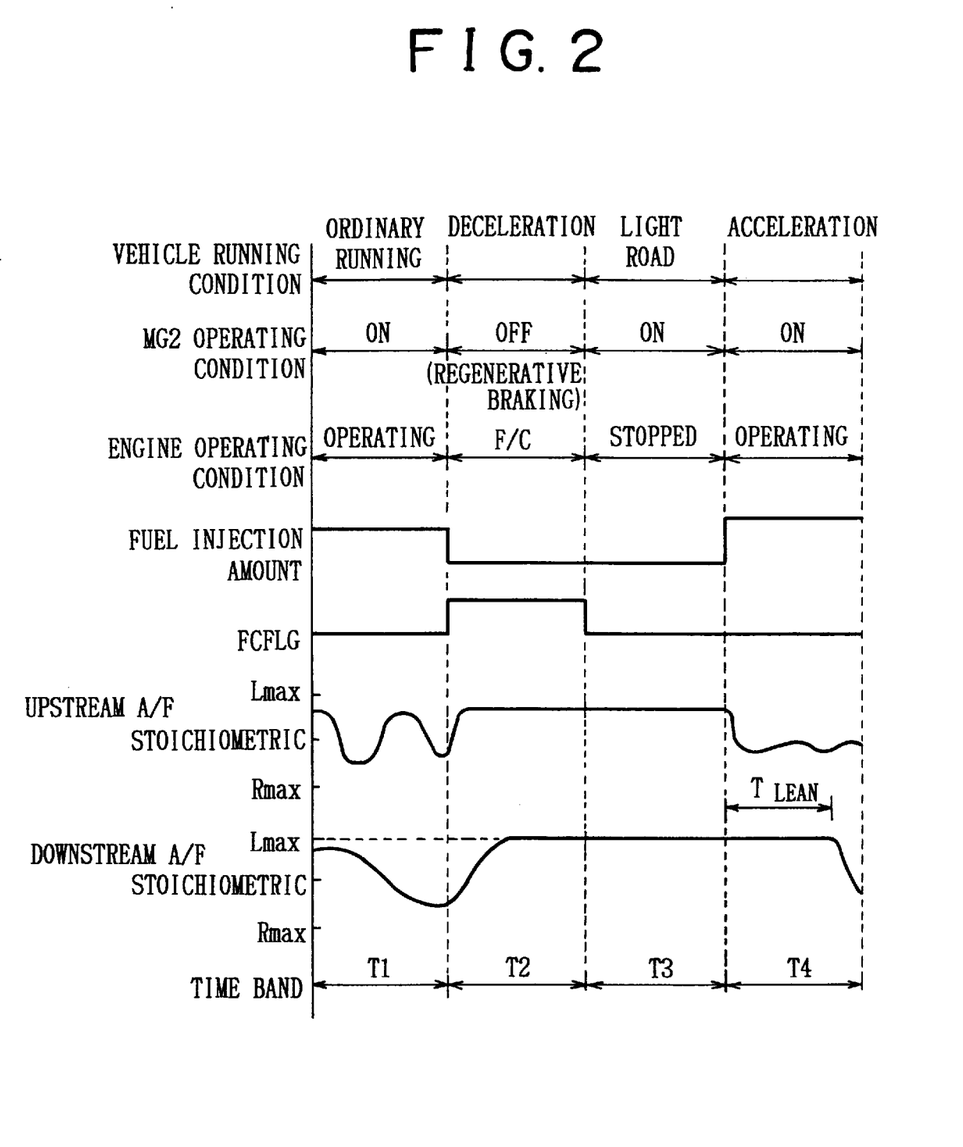
FIG. 2 is a time chart illustrating the catalyst deterioration determination according to the invention.

FIG. 2 is a time chart illustrating the catalyst deterioration determination according to the invention, in which the horizontal axis indicates time. From the top to the bottom, the chart indicates the running condition of the vehicle, the operating condition of the drive motor MG2, the operating condition of the engine, the amount of fuel injected, a deceleration/braking flag FCFLG, the output of the upstream air-fuel ratio sensor, and the output of the downstream air-fuel ratio sensor.

During a time period T1, the vehicle running condition is an ordinary running condition. During this time period, the drive motor MG2 is driven and the engine is also in operation. An amount of fuel to be injected into the engine is determined by correcting a basic fuel injection amount Tp that is calculated based on the flow of intake air detected by the air flow meter and the engine revolution speed detected by the crank angle sensor. More specifically, a fuel injection amount is determined by correcting the basic fuel injection amount Tp so that the air-fuel ratio of exhaust gas flowing into the catalyst becomes equal to a target air-fuel ratio (e.g., the theoretical air-fuel ratio), based on the outputs of the upstream and downstream air-fuel ratio sensors. The thus-determined fuel injection amount is supplied into the engine from each fuel injection valve at a predetermined injection timing. The predetermined injection timing is determined by a conventionally-employed fuel injection calculating routine. During the time period T1, the output of the upstream air-fuel ratio sensor has a shorter rich/lean reversion period than the output of the downstream air-fuel ratio sensor, as indicated in FIG. 2.

During a time period T2, the vehicle is in a decelerating condition. During this time period, the drive motor MG2 operates as a generator to perform regenerative braking. Fuel to the engine is cut in a high-revolution speed region, and the engine is stopped in a low-to-intermediate revolution speed region. Therefore, the amount of fuel supplied into the engine becomes zero. During the time period T2, oxygen is discharged from the engine, so that an excessive-oxygen condition is established. Therefore, the outputs of the downstream and upstream air-fuel ratio sensors exhibit a maximum lean output Lmax.

During a time period T3, the vehicle is in a light load running condition. During this time period, the drive motor MG2 is driven and the engine is kept stopped. Therefore, the outputs of the upstream and downstream air-fuel ratio sensors are maintained at the maximum lean output Lmax during the time period T3, as indicated in FIG. 2.

Based on consideration of this fact, the catalyst deterioration detection according to the invention has been developed. In a system in which a motor is not provided as a power source, when the air-fuel ratio is switched to the rich side after execution of the engine fuel cut control, the catalyst deterioration detection is performed based on the length of time up to the switching of the air-fuel ratio of exhaust gas flowing downstream of the catalyst from the lean side to the rich side. However, during execution of the fuel cut control, the catalyst hardly ever stores oxygen up to the limit of oxygen storing capacity of the catalyst, so that deterioration of the catalyst cannot be detected with good precision. In contrast, in this embodiment, if the engine is stopped when the catalyst atmosphere contains an excess amount of oxygen, transfer of heat from the catalyst to the outside of the catalyst by exhaust gas is considerably reduced, so that the decreasing rate of the catalyst temperature becomes small. As a result, a condition in which an excess amount of oxygen is present near the catalyst and the catalyst has a relatively high temperature that allows the catalyst to store oxygen is maintained. That is, during the time period T3, the catalyst takes up and stores oxygen up to the limit of the oxygen storing capacity of the catalyst, so that the catalyst deterioration detection precision can be increased.

During a time period T4, the vehicle is in an accelerating condition established upon an increased torque request from a driving person. During this period, the driving of the drive motor MG2 is continued, and the engine is restarted. An amount of fuel to be injected into the engine is calculated such that a fuel-rich mixture is supplied into the engine and, therefore, the catalyst deterioration determination can be performed within a short time, unlike the calculation of the fuel injection amount executed during the time period T1. Due to the supply of a fuel-rich mixture, the output of the upstream air-fuel ratio sensor shifts to the rich side as indicated in FIG. 2. On the other hand, the output of the downstream air-fuel ratio sensor remains in the lean side for a while because oxygen stored in the catalyst is discharged therefrom. The output of the downstream air-fuel ratio sensor then gradually changes to the rich side.

A catalyst deterioration determining routine according to the invention will be described.

Figure 3:
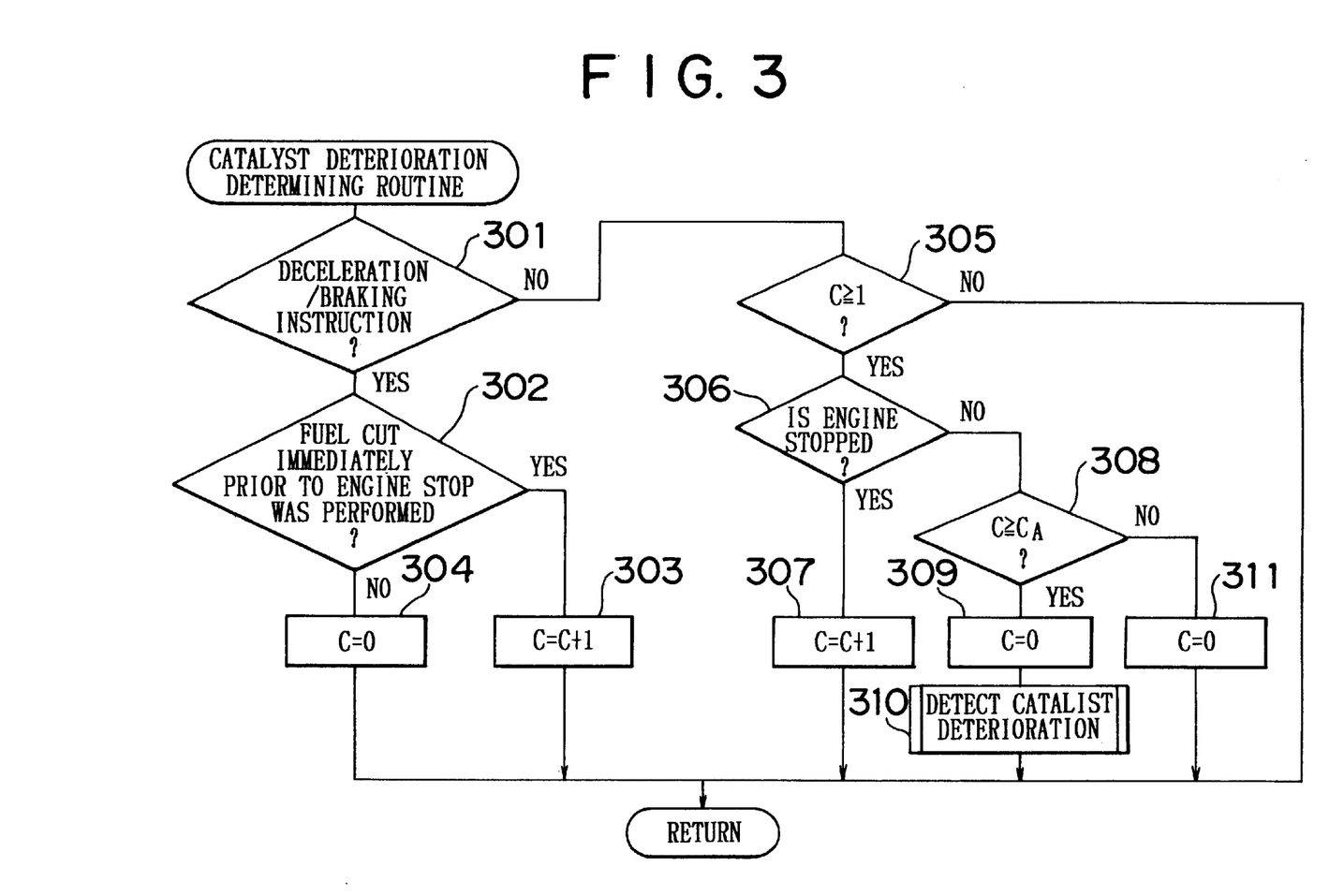
FIG. 3 is a flowchart illustrating a catalyst deterioration determining routine according to the invention.

FIG. 3 is a flowchart illustrating a catalyst deterioration determining routine according to the invention. This routine is periodically executed at predetermined intervals, for example, every 100 ms.

In step 301 in the routine, it is determined whether the present drive mode in accordance with the vehicle running condition, that is, the present wheel driving mode, is the mode corresponding to the decelerating and braking condition. This determination is executed by determining whether a deceleration/braking instruction was outputted on the basis of the output signal of the accelerator pedal position sensor (not shown), the brake pedal position sensor (not shown) and the like during operation of the engine. If the determination in step 301 is affirmative, the process proceeds to step 302.

In step 302, it is determined whether the fuel cut immediately before stop of the engine was performed. If the determination is affirmative, the process proceeds to step 303. If the determination is negative, the process proceeds to step 304. The determination in step 302 is executed with reference to the deceleration/braking flag FCFLG. The deceleration/braking flag FCFLG is set when it is determined that the deceleration/braking instruction is outputted during operation of the engine. The flag is reset when it is determined that the deceleration/braking instruction has been removed. When FCFLG=1, it is determined in step 302 that the fuel cut immediately before stop of the engine was performed.

In step 303, the value of a counter C is increased by 1 (C=C+1), and a time during which the fuel cut was performed, corresponding to the time period T2, is calculated (C/10 sec.). On the other hand, in step 304, the counter C is reset (C=0).

If the determination in step 301 is negative, the process proceeds to step 305. In step 305, it is determined whether the value of the counter C is equal to or greater than 1. If C>1, it is considered that the fuel cut was performed, and the process proceeds to step 306. If C=0 is determined in step 305, it means that the fuel cut has not been performed and, therefore, the catalyst deterioration determination cannot be performed. Therefore, the negative determination in step 305 is followed by the end of the execution of the routine.

In step 306, it is determined whether the engine has remained stopped (has not been restarted). If the engine has remained stopped (YES in step 306), the process proceeds to step 307. If the determination in step 306 is negative, the process proceeds to step 308. The determination in step 306 is executed on the basis of determination as to whether the drive mode is the takeoff and/or light-load running mode. The determination as to whether the vehicle is taking off is executed based on the output signal of the accelerator pedal position sensor. The determination as to whether the vehicle is in the light-load running condition is executed as follows. That is, it is determined that the vehicle is in the light-load running condition, if the energy Pr to be outputted to a ring gear shaft is less than a predetermined energy PML and the rotation speed Nr of the ring gear shaft is less than a predetermined rotation speed NML. Calculation of the energy Pr to be outputted to the ring gear shaft and detection of the rotation speed Nr of the ring gear shaft will be described below after description of the planetary gear.

Figure 4:
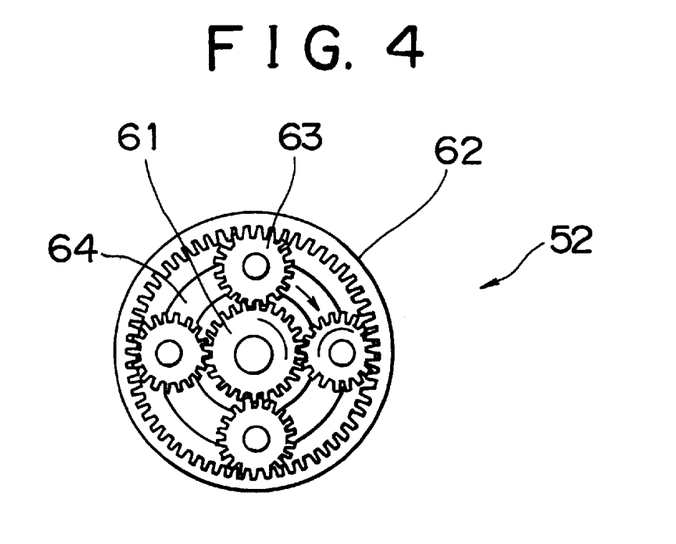
FIG. 4 is a sectional view of a planetary gear.

FIG. 4 is a sectional view of the planetary gear. The planetary gear 52 is substantially made up of a sun gear 61, a ring gear 62, plural (four in FIG. 4) planetary pinion gears 63, and a planetary carrier 64. The sun gear 61 is disposed radially inward in the planetary gear 52. The sun gear 61 is coupled to a hollow sun gear shaft through which the crankshaft 51 extends along the center axis of the sun gear shaft. The ring gear 62 is disposed coaxially with the crankshaft 51. The ring gear 62 is disposed radially outward in the planetary gear 52. The planetary pinion gears 63 are disposed between the sun gear 61 and the ring gear 62 so that the planetary pinion gears 63 revolve round the sun gear 61 while rotating about their own axes. The planetary carrier 64 is coupled to an end portion of the crankshaft 51, and supports each planetary pinion gear 63 at its rotating axis.

The sun gear 61 of the planetary gear 52 is connected to the starter motor MG1 via the sun gear shaft. The ring gear 62 is connected to a shaft of the drive motor MG2, and also connected to the differential gear 54 via the ring gear shaft and the power transmitting gear 53. The planetary pinion gears 63 are connected to the crankshaft 51.

When a power inputted to or outputted from any two of the three shafts, that is, the sun gear shaft, the ring gear shaft and the crankshaft 51 coupled to the sun gear 61, the ring gear 62 and the planetary carrier 64, respectively, is determined, a power to be inputted to or outputted from the other one shaft is determined based on the power to be inputted or outputted from the two shafts.

The aforementioned energy Pr can be calculated from an instructed torque value Tr and a rotation speed Nr as follows:

$$Pr = Tr \times Nr$$

The instructed torque value Tr and the rotation speed Nr will be described.

Figure 5:
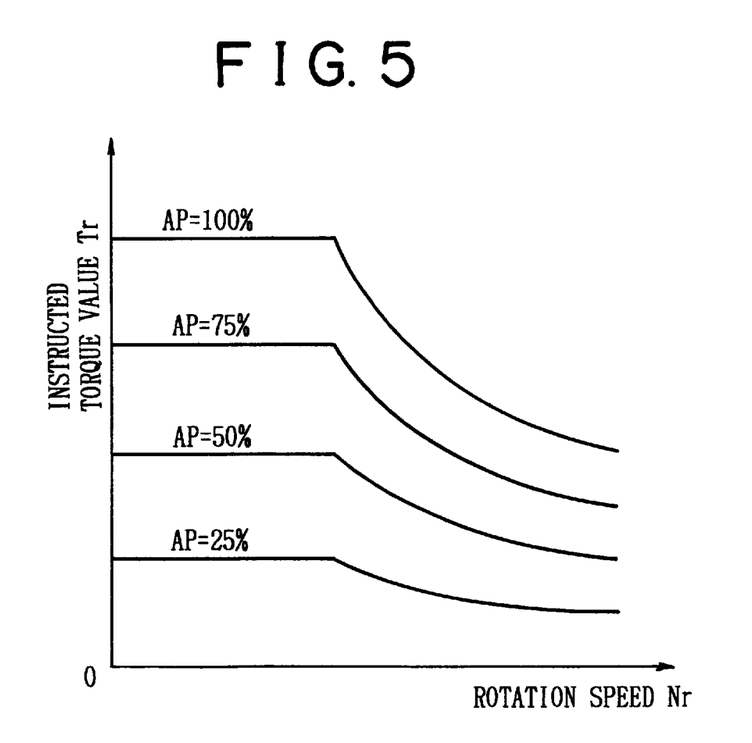
FIG. 5 is a map for determining an instructed torque value Tr from a rotation speed Nr and an accelerator pedal position AP.

FIG. 5 is a map for determining an instructed torque value Tr from a rotation speed Nr and an accelerator pedal position AP. The rotation speed Nr of the ring gear shaft can be determined from a rotational angle θr of the ring gear shaft read from a resolver (not shown). The accelerator pedal position AP is obtained by reading the output of the accelerator pedal position sensor (not shown). The instructed torque value Tr is calculated from the rotation speed Nr of the ring gear shaft and the accelerator pedal position AP in accordance with the map of FIG. 5 pre-stored in the ROM 42.

In step 307 in FIG. 3, the value of the counter C is increased by 1 (C=C+1). The counting timing corresponds to a time period T2+T3 during which the fuel cut was performed. The length of time obtained by summing the time T2 and the time T3 is calculated as C/10 sec.

In step 308 following the negative determination in step 306, it is determined whether the value of the counter C is equal to or greater than a predetermined value CA ($C \geq C_A$). That is, it is determined whether the time period during which the fuel cut was performed is equal to or greater than a predetermined length of time. If the determination is negative, the process proceeds to step 311, in which the counter C is reset (C=0).

If the determination in step 308 is affirmative, the process proceeds to step 309.

In step 309, the counter C is reset (C=0). Subsequently in step 310, a catalyst deterioration detecting routine is executed as illustrated in detail in FIG. 6.

Figure 6:
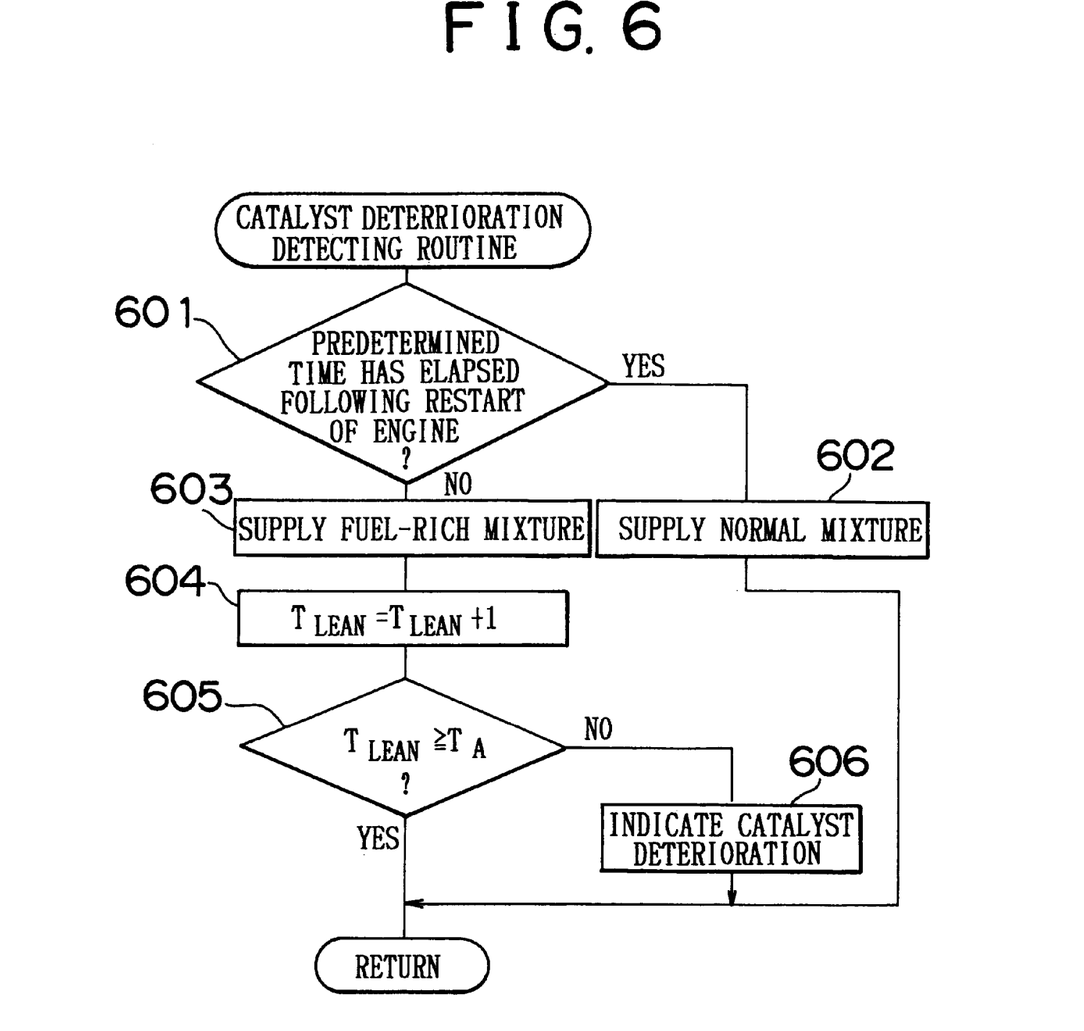
FIG. 6 is a flowchart illustrating a catalyst deterioration detecting routine according to the invention.

FIG. 6 is a flowchart illustrating the catalyst deterioration detecting routine according to the invention. This routine is periodically executed at predetermined intervals, for example, every 100 ms. In step 601 of the routine, it is determined whether a predetermined time has elapsed following the restart of the engine. If the determination is affirmative, the process proceeds to step 602. If the determination is negative, the process proceeds to step 603. In step 603, a rich air-fuel ratio is set so as to supply a fuel-rich mixture to the engine during the predetermined period. A rich air-fuel ratio can be set by performing a fuel increasing correction on the basic fuel injection amount Tp calculated from a map that is determined by the intake air flow and the revolution speed of the engine. In step 602, on the other hand, the fuel increasing correction is discontinued to resume normal fuel supply. After step 602, the execution of the routine ends.

In step 604, a fuel-lean duration $T_{LEAN}$ UP to the switching of the output of the downstream air-fuel ratio sensor from the rich side to the lean side during a period during which the air-fuel ratio was set to the rich side is measured. This time measurement is performed by summing up time ($T_{LEAN}=T_{LEAN}+1$). The initial setting of $T_{LEAN}$ is zero.

Subsequently in step 605, it is determined whether the fuel-lean duration $T_{LEAN}$ measured in step 604 is equal to or greater than a predetermined length of time $T_A$ ($T_{LEAN \geq TA}$). If the determination in step 605 is affirmative, it is considered that the catalyst has not significantly deteriorated. Then, the execution of the routine ends. If the determination in step 605 is negative, it is considered that the oxygen storing capacity of the catalyst has decreased and therefore the catalyst has significantly deteriorated. The process then proceeds to step 606, in which an indicator lamp (not shown) is turned on.

The foregoing embodiment detects whether the catalyst has deteriorated when the engine is started upon an increase in the requested torque. However, it is also possible to detect whether the catalyst has deteriorated when the engine is started due to a factor irrelevant to the requested torque.

As is apparent from the above description, the catalyst deterioration detecting apparatus of the invention causes the catalyst to adsorb oxygen up to its maximum oxygen adsorbing capacity, so that catalyst deterioration can be detected with high precision.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. A catalyst deterioration detecting apparatus for detecting deterioration of a catalyst provided in an exhaust passage of an internal combustion engine, an output shaft of the engine being connected to an electric motor, the apparatus comprising:

an air-fuel ratio sensor provided downstream of the catalyst; and a controller which, under a predetermined vehicle running condition, temporarily stops the engine while the electric motor is driven and then restarts the engine, the controller estimating an amount of oxygen stored in the catalyst and determining a degree of deterioration of the catalyst based on the estimated amount of oxygen and an output of the air-fuel ratio sensor after the engine has been restarted.

2. An apparatus according to claim 1, wherein the controller determines that the degree of deterioration of the catalyst is excessive when the estimated amount of oxygen is equal to or greater than a predetermined amount.

3. An apparatus according to claim 1, wherein the controller performs a control such that a fuel-rich mixture is supplied to the engine from a beginning of a restart of the engine, the controller determining whether the degree of deterioration of the catalyst is excessive based on a time duration between supply of the fuel-rich mixture and a reversion of the output of the air-fuel ratio sensor from a lean value to a rich value.

4. An apparatus according to claim 1, wherein the controller estimates an amount of oxygen stored in the catalyst while the engine is temporary stopped.

5. An apparatus according to claim 1, wherein the controller performs a control such that an atmosphere surrounding the catalyst before the engine is temporarily stopped contains an excess amount of oxygen.

6. A method for detecting deterioration of a catalyst provided in an exhaust passage of an internal combustion engine whose output shaft is connected to an electric motor, the method comprising the steps of:

providing an air-fuel ratio sensor downstream of the catalyst;

temporarily stopping the engine while driving the electric motor under a predetermined vehicle running condition;

restarting the engine;

estimating an amount of oxygen stored in the catalyst; and determining whether the catalyst has deteriorated based on the estimated amount of oxygen and an output produced by the air-fuel ratio sensor after the engine has been restarted.

7. A method according to claim 6, wherein it is determined that the catalyst has deteriorated when the estimated amount of oxygen is equal to or greater than a predetermined amount.

8. A method according to claim 6, further comprising the step of controlling the engine such that a fuel-rich mixture is supplied from a beginning of the restarting of the engine, wherein it is determined whether the catalyst has deteriorated, based on a time duration between the beginning of the supply of the fuel-rich mixture and a reversion of the output of the air-fuel ratio sensor from a lean value to a rich value.

9. A method according to claim 6, wherein the estimation of the amount of oxygen stored in the catalyst is performed while the engine is temporarily stopped.

10. A method according to claim 6, wherein a control is performed such that an atmosphere around the catalyst before the engine is temporarily stopped contains an excess amount of oxygen.

\* \* \* \* \*